(12) United States Patent
Sun

(10) Patent No.: US 9,576,171 B2
(45) Date of Patent: Feb. 21, 2017

(54) PORTABLE SCANNING DEVICE

(71) Applicant: HON HAI PRECISION INDUSTRY CO., LTD., New Taipei (TW)

(72) Inventor: Zong-Yuan Sun, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 30 days.

(21) Appl. No.: 14/568,775

(22) Filed: Dec. 12, 2014

(65) Prior Publication Data

US 2016/0063293 A1  Mar. 3, 2016

(30) Foreign Application Priority Data

Sep. 1, 2014 (CN) .......................... 2014 1 0439506

(51) Int. Cl.
*G06K 7/10* (2006.01)

(52) U.S. Cl.
CPC ................... *G06K 7/10891* (2013.01)

(58) Field of Classification Search
CPC ............ G06K 7/10881; G06K 17/0022; G06K 2007/10534; G06K 2207/1012; G06K 2207/1016; G06K 2207/1017; G06K 2207/1018; G06K 7/10; G06K 7/10564; G06K 7/10594; G06K 7/10603; G06K 7/10693; G06K 7/10702; G06K 7/10792; G06K 7/10801; G06K 7/10851; G06K 7/10861; G06K 7/10891; G06K 7/14; G06K 7/1443; G06K 7/10584; G06K 7/10663; G06K 7/10673; G06K 7/10752; G06K 7/10811; G06K 7/10871;G06K 7/109; G06K 7/1098; A45C 11/00; A45C 2011/001; A45C 2011/003; G04G 9/00; G04G 9/08; G06F 1/1628; G06F 1/189; G07C 2009/00095; G07C 9/00087; H04B 1/3883; H04M 1/0262; H04M 1/04; H05K 13/00; Y10T 29/49002; Y10T 29/49826

(Continued)

(56) References Cited

U.S. PATENT DOCUMENTS 3,978,318 A * 8/1976 Romeo .............. G06K 7/10881
235/462.45
5,576,530 A * 11/1996 Hagerty ............. G06K 7/10752
235/462.47

(Continued)

*Primary Examiner* — Thien M Le
*Assistant Examiner* — Tae Kim
(74) *Attorney, Agent, or Firm* — Zhigang Ma

(57) ABSTRACT

A portable scanning device includes a first outer shell defining a receiving space therein, a second outer shell configured to couple with the first outer shell to cover the receiving space, a connecting band coupled to the first outer shell and configured to be secured to a body part of a user, and an electronic assembly including a number of electronic components. The number of electronic components includes a battery configured to provide power for the portable scanning device, a printed circuit board, a scanner configured to scan a plurality of codes, a speaker configured to broadcast an audio during a process of scanning the plurality of codes, a connection port configured to couple the battery to an external power source to charge the battery, a number of buttons for operating the portable scanning device, and a number of indication lights configured to indicate statuses of the portable scanning device.

16 Claims, 6 Drawing Sheets

(58) Field of Classification Search
USPC .................................................. 235/462.44
See application file for complete search history.

(56) References Cited

U.S. PATENT DOCUMENTS

| | | | | |
|---|---|---|---|---|
| 5,850,078 | A * | 12/1998 | Giordano | G06K 7/10881 235/462.27 |
| 6,648,229 | B1 * | 11/2003 | Knowles | G06K 7/10 235/462.44 |
| 6,761,317 | B1 * | 7/2004 | Knowles | G06K 7/10 235/375 |
| 2001/0036128 | A1 * | 11/2001 | Fujio | G04G 9/00 368/82 |
| 2005/0122210 | A1 * | 6/2005 | Huseth | G07C 9/00087 340/5.53 |
| 2008/0078838 | A1 * | 4/2008 | Morris | G06K 7/10891 235/462.44 |
| 2008/0217411 | A1 * | 9/2008 | Ledwith | G06K 17/0022 235/472.02 |
| 2010/0124040 | A1 * | 5/2010 | Diebel | G06F 1/1628 361/816 |

* cited by examiner

PORTABLE SCANNING DEVICE

FIELD

The subject matter herein relates to scanning devices.

BACKGROUND

Generally, bar codes are scanned by a scanning device.

BRIEF DESCRIPTION OF THE DRAWINGS

Implementations of the present technology will now be described, by way of example only, with reference to the attached figures.

DETAILED DESCRIPTION

Figure 1:
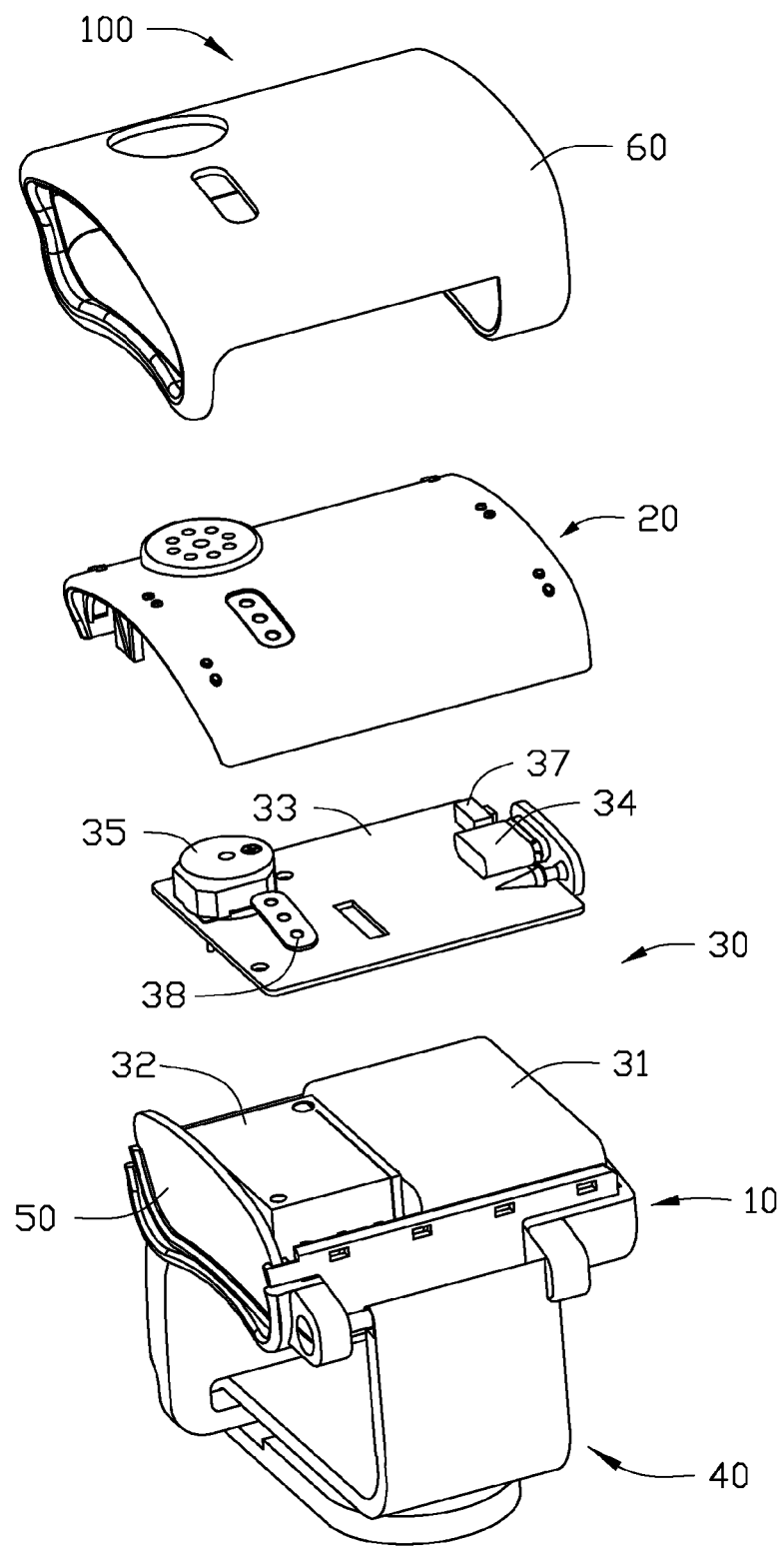
FIG. 1 is a partially exploded isometric view of an exemplary embodiment of a portable scanning device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates an exploded view of an exemplary embodiment of a portable scanning device 100 (hereinafter "the device 100"). The device 100 can include a first outer shell 10, a second outer shell 20, an electronic assembly 30, and a connecting band 40. In at least one embodiment, the connecting band 40 can secure the device 100 on a finger of a user. The device 100 can be used to scan a plurality of codes, such as bar codes. After the device 100 scans each code, the code can be transmitted to an external electronic device, such as a personal computer, via BLUETOOTH®.

Figure 2:
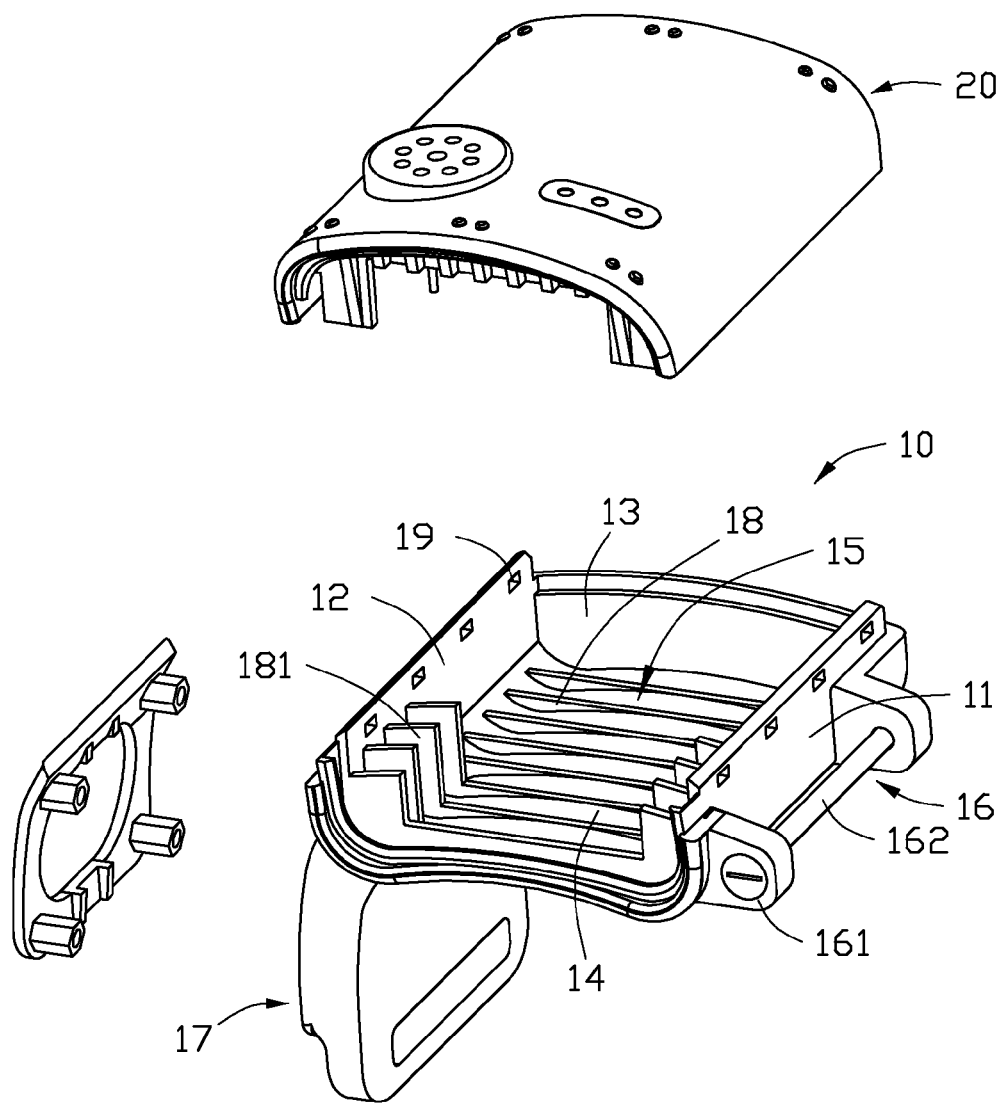
FIG. 2 is an exploded isometric view of a first outer shell and a second outer shell of the portable scanning device.

Referring to FIG. 2, the first outer shell 10 can include a first sidewall 11, a second sidewall 12, a back wall 13, and a bottom wall 14. The first sidewall 11 and the second sidewall 12 can be connected to opposite edge portions of the bottom wall 14 and face each other. The back wall 13 can be connected between the first sidewall 11 and the second sidewall 12, and be connected to the bottom wall 14. Thus, the first sidewall 11, the second sidewall 12, the back wall 13, and the bottom wall 14 can cooperatively define a receiving space 15.

The first outer shell 10 can further include a first connecting portion 16 and a second connecting portion 17. A first end portion of the connecting band can be connected to the first outer shell 10 by the first connecting portion 16, and a second end portion of the connecting band can be connected to the first outer shell 10 by the second connecting portion 17. The first connecting portion 16 can include a pair of connecting blocks 161 protruding from an outer surface of the first sidewall 11, and a connecting shaft 162 connected between the pair of connecting blocks 161. The connecting shaft 162 can sleeve the first end portion of the connecting band.

Referring again to FIG. 1, the electronic assembly 30 can include a battery 31, a scanner 32, a printed circuit board 33, a connection port 34, a speaker 35, a power button 36 (shown in FIG. 4), a reset button 37, and a plurality of indication lights 38. The battery 31 can provide power for the device 100. The scanner 32 can scan the plurality of codes. The connection port 34 can connect the battery 31 to a power source via a cable (not shown) to charge the battery 31. The speaker 35 can broadcast an audio after the scanner 32 completes scanning each code. The power button can power on the device 100 by being pressed and held for a predetermined time duration. The scanner 32 can be controlled to scan by pressing the power button after the device 100 is powered on. The reset button 32 can be pressed after the device 100 is powered on to reset the scanner 32. The scanner 32 can include a lens 50 for scanning the plurality of codes.

Referring again to FIG. 2, the first outer shell 10 can further include a plurality of ribs 18 protruding into the receiving space 15 from the bottom wall 14. The ribs 18 can be substantially parallel to each other. The battery and the scanner can be supported on top of the ribs 18. Each of the ribs 18 that supports the scanner can include a pair of rib plates 181 at opposite end portions of the rib 18. The rib plates 181 can support opposite sides of the scanner and hold the scanner in place on the ribs 18. A plurality of latching holes 19 can be defined in the first sidewall 11 and the second sidewall 12. A plurality of latching members (not shown) of the second outer shell 20 can latch in the latching holes 19 to secure the second outer shell 20 to the first outer shell 10.

Figure 3:
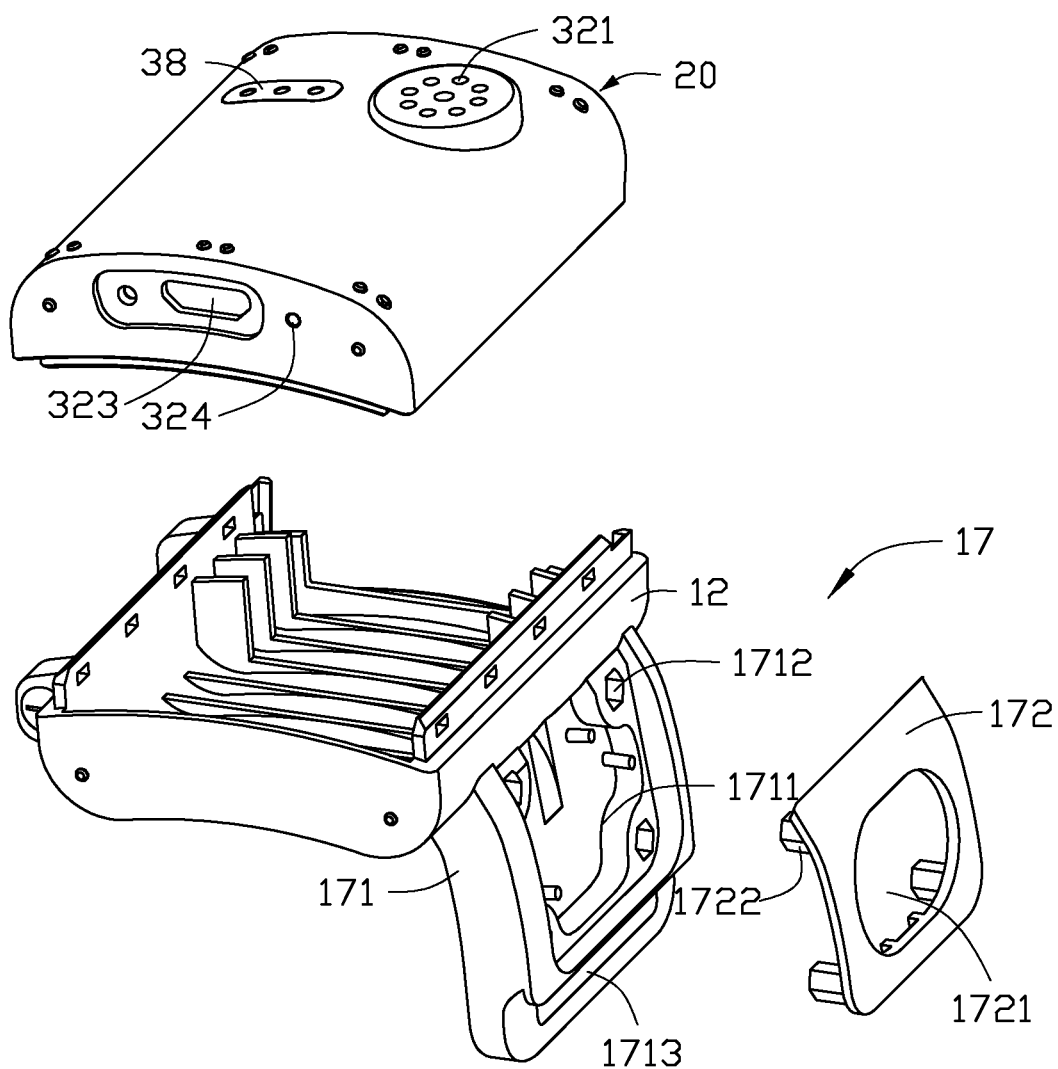
FIG. 3 is similar to FIG. 2, but viewed from a different angle.

Referring to FIG. 3, the second connecting portion 17 can include a button panel 171 extending away from an outer surface of the second sidewall 12, and a panel cover 172. A button groove 1711 can be defined in a surface of the button panel 171 for receiving the power button 36 (shown in FIG. 4). A plurality of securing holes 1712 surrounding the button groove 1711 can be defined in the surface of the button panel 171. A button hole 1721 can be defined in the panel cover 172. The panel cover 172 can include a plurality of securing posts 1722 corresponding to the plurality of securing holes 1712. The plurality of securing posts 1722 can be received in the plurality of securing holes 1712 to secure the panel cover 172 to the button panel 171. When the panel cover 172 is secured to the button panel 171, the power button can protrude through the button hole 1721. A slot 1713 can be defined in a distal portion of the button panel 171. The slot 1713 can receive the second end portion of the connecting band to secure the connecting band to the second panel 17.

Figure 4:
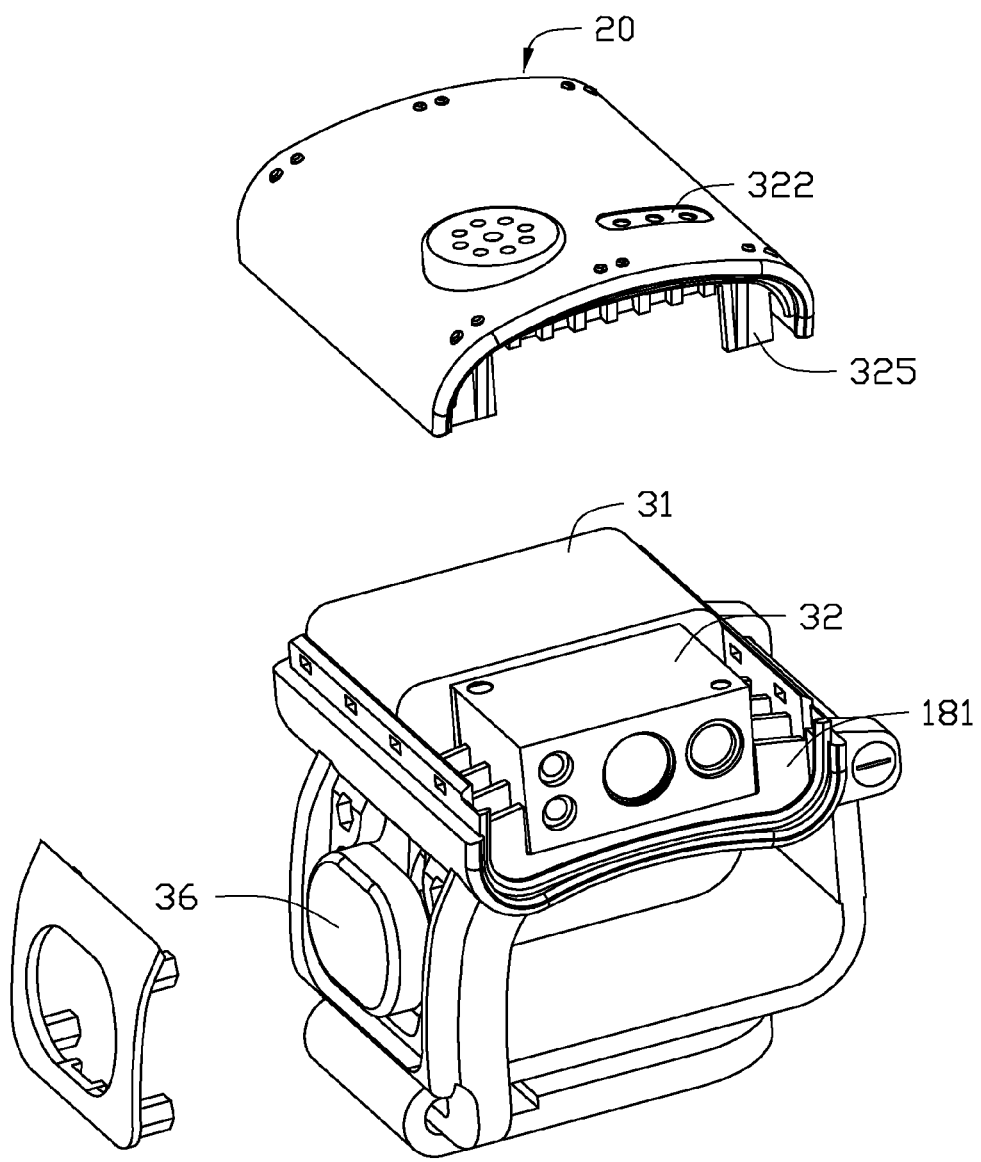
FIG. 4 is a partially assembled isometric view of the portable scanning device.

Referring to FIGS. 3 and 4, the second outer shell 20 can define a plurality of speaker holes 321, an indication light groove 322, a port hole 323, and a reset button hole 324 therein. The plurality of speaker holes 321 can align with the speaker to allow the audio to transmit therethrough. The indication light groove 322 can receive the plurality of indication lights 38 therein. The indication lights 38 can be electrically connected to the printed circuit board through the indication light groove 322. The port hole 323 can align with the connection port to allow a cable to extend therethrough to electrically connect the battery to a power source. The reset button hole 324 can align with the reset button to allow the reset button to be pressed. The second outer shell 20 can also include a pair of supporting plates 325. The pair of supporting plates 325 can align with an outermost pair of rib plates 181 to cooperatively support a back portion of the lens 50.

Figure 5:
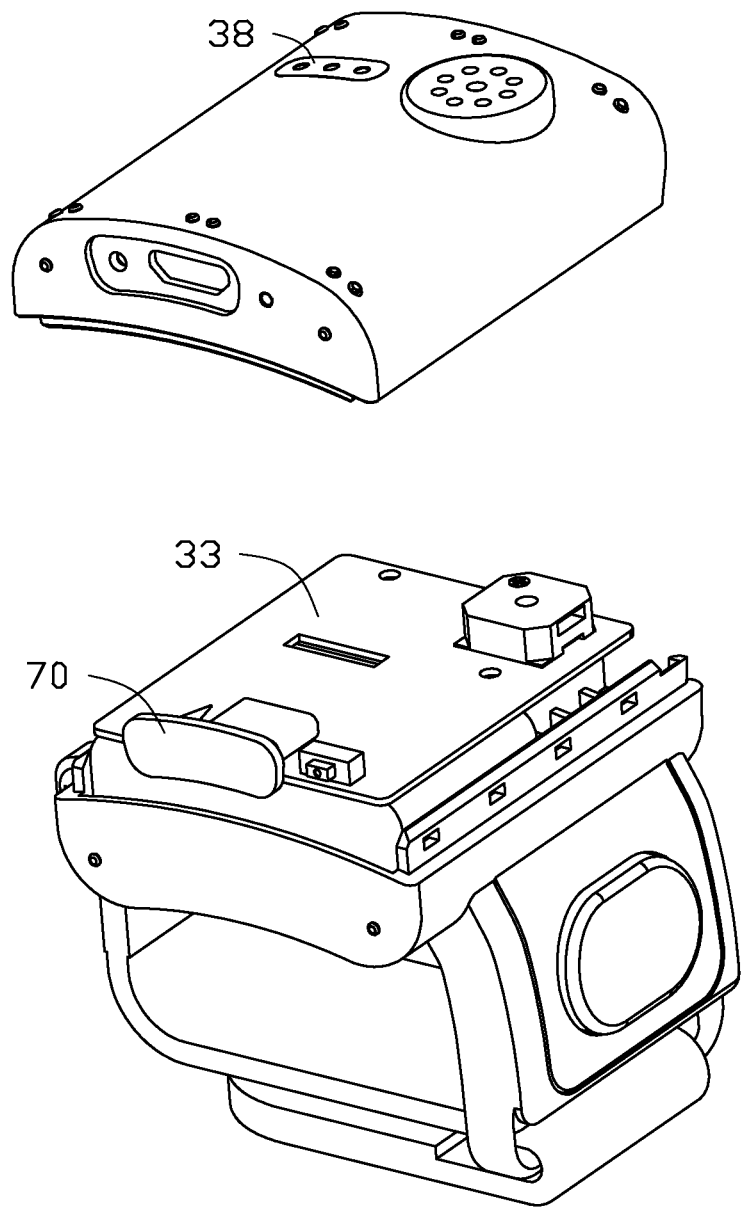
FIG. 5 is another partially assembled isometric view of the portable scanning device.
Figure 6:
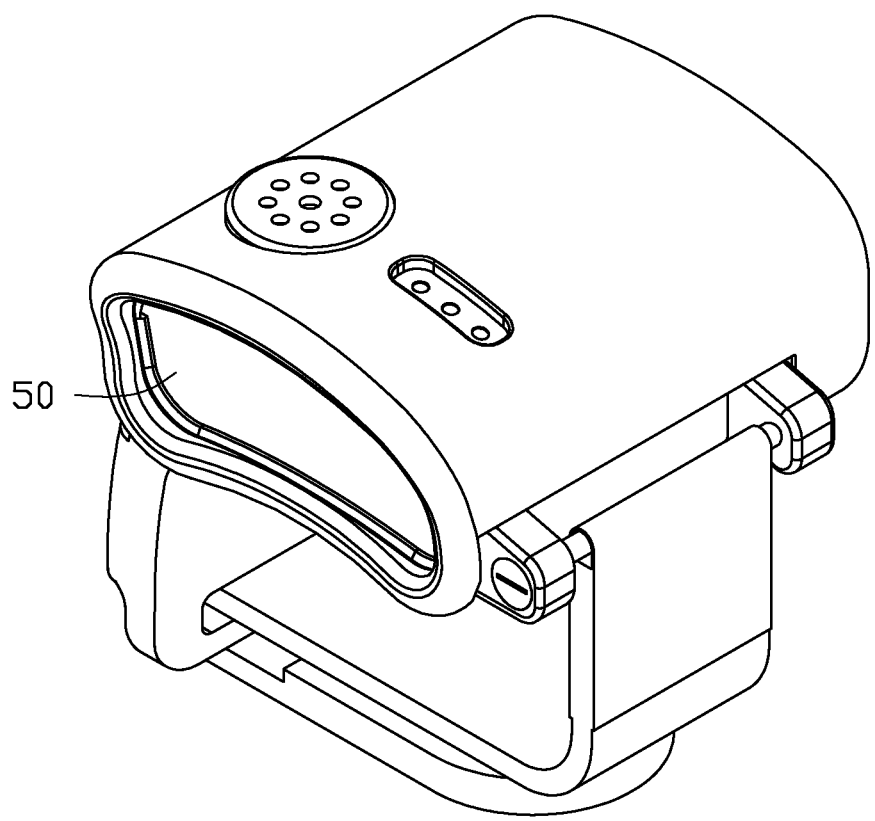
FIG. 6 is an assembled isometric view of the portable scanning device.

Referring to FIGS. 4-6, in assembly, the battery 31 and the scanner 32 can be received in the receiving space of the first outer shell. The battery 31 can be located adjacent to the back wall of the first outer shell, and the scanner 32 can be located between the plurality of rib plates of the first outer shell. The lens 50 can be positioned at an end junction of the first outer shell and the second outer shell to face out of the scanning device to scan the plurality of codes. The printed circuit board 33 can be positioned on top of the battery 31 and the scanner 32. The plurality of indication lights 38 can be received in the indication light groove 322. The power button 36 can be received in the button groove. The plurality of indication lights 38 and the power button 36 can be electrically connected to the printed circuit board 33 via the indication light groove 322 and the button groove, respectively.

The device can further include a sleeve 60 (shown in FIG. 1) for receiving the first outer shell and the second outer shell therein. The sleeve can define a plurality of through holes to allow corresponding parts of the device to not be covered by the sleeve 60. The device can further include a stopper 70 (shown in FIG. 5) for plugging the port hole when the connection port is not in use.

In use, the device can be used to scan the plurality of codes. After the device scans each code, the code can be transmitted to an external electronic device via BLUETOOTH. After each code is scanned successfully, the speaker can broadcast an audio to notify the user. The device can be worn on a finger of the user, and the device is convenient to operate.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A portable scanning device comprising:
   a first outer shell defining a receiving space therein;
   a second outer shell configured to couple with the first outer shell to cover the receiving space;
   a connecting band coupled to the first outer shell and configured to be secured to a body part of a user; and
   an electronic assembly comprising a plurality of electronic components, the plurality of electronic components comprising:
   a battery configured to provide power for the portable scanning device;
   a printed circuit board;
   a scanner configured to scan a plurality of codes;
   a speaker configured to broadcast an audio while scanning the plurality of codes;
   a connection port configured to couple the battery to an external power source to charge the battery;
   a plurality of buttons for operating the portable scanning device; and
   a plurality of indication lights configured to indicate statuses of the portable scanning device, wherein the first outer shell comprises:
   a bottom wall;
   a first sidewall and a second sidewall connected to opposite edge portions of the bottom wall and facing each other;
   a back wall connected to an end portion of the bottom wall and connected between the first sidewall and the second sidewall;
   a first connecting portion protruding from the first sidewall and configured to connect a first end portion of the connecting band to the first outer shell; and
   a second connecting portion protruding from the second sidewall and configured to connect a second end portion of the connecting band to the first outer shell;
   wherein the first outer shell further comprises a plurality of ribs located inside the receiving space and protruding from the bottom wall;
   the ribs are arranged parallel to each other;
   the battery and the scanner are supported on top of the ribs;
   the battery is arranged adjacent to the back wall;
   each of the ribs supporting the scanner comprises a pair of rib plates, the scanner is located between the plurality of rib plates;
   a lens of the scanner is positioned at an end junction of the first outer shell and the second outer shell to face out of the scanning device to scan the codes; and
   the printed circuit board is located on top of the battery and the scanner.

2. The portable scanning device as in claim 1, wherein the plurality of buttons comprises:
   a power button for powering on the scanner and controlling the scanner to scan a code of the plurality of codes; and
   a reset button for restarting the scanner.

3. The portable scanning device as in claim 2, wherein:
   to power on the portable scanning device, the power button is pressed and held for a predetermined time duration; and
   to control the scanner to scan a code, the power button is pressed after the portable scanning device is powered on.

4. The portable scanning device as in claim 2, wherein:
   the reset button, the connection port, and the speaker are arranged on the printed circuit board; and the battery, the scanner, and the printed circuit board are received in the receiving space.

5. The portable scanning device as in claim 4, wherein the receiving space is cooperatively defined by the bottom wall, the first sidewall, the second sidewall, and the back wall.

6. The portable scanning device as in claim 4, wherein the first connecting portion comprises: a pair of connecting blocks protruding from an outer surface of the first sidewall; and a connecting shaft connected between the pair of connecting blocks and configured to sleeve the first end portion of the connecting band.

7. The portable scanning device as in claim 4, wherein the second connecting portion comprises: a button panel extending away from an outer surface of the second sidewall and configured to receive the power button therein; a panel cover configured to couple with the button panel to secure the power button in the button panel; and a slot defined in a distal portion of the button panel and configured to receive the second end portion of the connecting belt therethrough to secure the connecting belt to the second connecting portion.

8. The portable scanning device as in claim 7, wherein:
the power button is received in a button groove defined in a surface of the button panel, the power button being electrically connected to the printed circuit board through the button groove;
the surface of the button panel defines a plurality of securing holes around the button groove;
the panel cover comprises a plurality of securing posts configured to be received in the securing holes;
the securing posts protrude from a same side of the panel cover;
the panel cover defines a button hole therethrough; and
the power button protrudes through the button hole when the securing posts are received in the securing holes to secure the panel cover to the button panel.

9. The portable scanning device as in claim 4, wherein: the pair of rib plates is protruding from opposite end portions of the rib; the pairs or rib plates are configured to support opposite sides of the scanner and hold the scanner in place on the ribs.

10. The portable scanning device as in claim 4, wherein: the first sidewall and the second sidewall of the first outer shell define a plurality of latching holes therein; the latching holes are configured to receive a plurality of latching members of the second outer shell; and the second outer shell is assembled to the first outer shell by the latching members being received in the latching holes.

11. The portable scanning device as in claim 4, wherein the second outer shell comprises: a plurality of speaker holes defined therein and configured to align with the speaker to allow the audio to transmit therethrough; an indication light groove configured to receive the plurality of indication lights therein, the indication lights being electrically connected to the printed circuit board through the indication light groove; a port hole defined therein and configured to align with the connection port, the port hole allowing a cable to extend therethrough to electrically connect to the connection port to charge the battery; a reset button hole defined therein and configured to align with the reset button, the reset button hole allowing the reset button to be pressed; and a pair of supporting plates configured to cooperate with an outermost pair of rib plates to support a back portion of the lens.

12. The portable scanning device as in claim 11 further comprising:
a stopper configured to plug the port hole when the connection port is not in use; and
a sleeve configured to receive the first outer shell and the second outer shell therein, the sleeve defining a plurality of through holes to allow corresponding parts of the portable scanning device to not be covered by the sleeve.

13. The portable scanning device as in claim 1, wherein the plurality of indication lights comprises:
a power indicator light configured to indicate that the scanner is powered on;
a scanning indicator light configured to indicate that the scanner is scanning a code; and
a charging indicator light configured to indicate that the battery is being charged.

14. The portable scanning device as in claim 1, wherein the scanner sends a scanning result of the plurality of codes to an external electronic device by BLUETOOTH.

15. The portable scanning device as in claim 1, wherein the codes are bar codes.

16. The portable scanning device as in claim 1, wherein the connecting band secures the portable scanning device to a finger of a user.

* * * * *